No. 865,966. PATENTED SEPT. 10, 1907.
H. GOLDIN.
MEANS FOR PRODUCING STAGE ILLUSIONS.
APPLICATION FILED MAR. 30, 1907.

2 SHEETS—SHEET 1.

No. 865,966. PATENTED SEPT. 10, 1907.
H. GOLDIN.
MEANS FOR PRODUCING STAGE ILLUSIONS.
APPLICATION FILED MAR. 30, 1907.

2 SHEETS—SHEET 2.

Witnesses.
Grace P. Brereton
C. H. Walker

Inventor
Horace Goldin
By C. L. Sturtevant
Atty

UNITED STATES PATENT OFFICE.

HORACE GOLDIN, OF LONDON, ENGLAND.

MEANS FOR PRODUCING STAGE ILLUSIONS.

No. 865,966.     Specification of Letters Patent.     Patented Sept. 10, 1907.

Original application filed February 21, 1906, Serial No. 302,250. Divided and this application filed March 30, 1907. Serial No. 365,503.

*To all whom it may concern:*

Be it known that I, HORACE GOLDIN, a citizen of the United States of America, of 17 Torrington Square, London, W. C., in the county of Middlesex, England, illusionist, have invented certain new and useful Improvements in Means for Producing Stage Illusions; and I hereby declare that the following is a full, clear, and exact description of the same and that this application is a division of my application for Letters Patent of the United States for the same invention filed February 21, 1906, Serial No. 302,250.

This invention relates to improvements in means for producing stage illusions and it consists of a series of nesting trunks having means for the concealed entrance of an individual, the object of the improvements being to provide a means whereby the illusion may be produced of an individual passing into the inner of a series of nesting trunks, the outer trunk or trunks of which are in a sound and intact condition, such process being effected in full view of the audience.

In order that this invention may be clearly understood and more easily carried into practice reference may be had to the following description and appended drawings.

Figure 1:
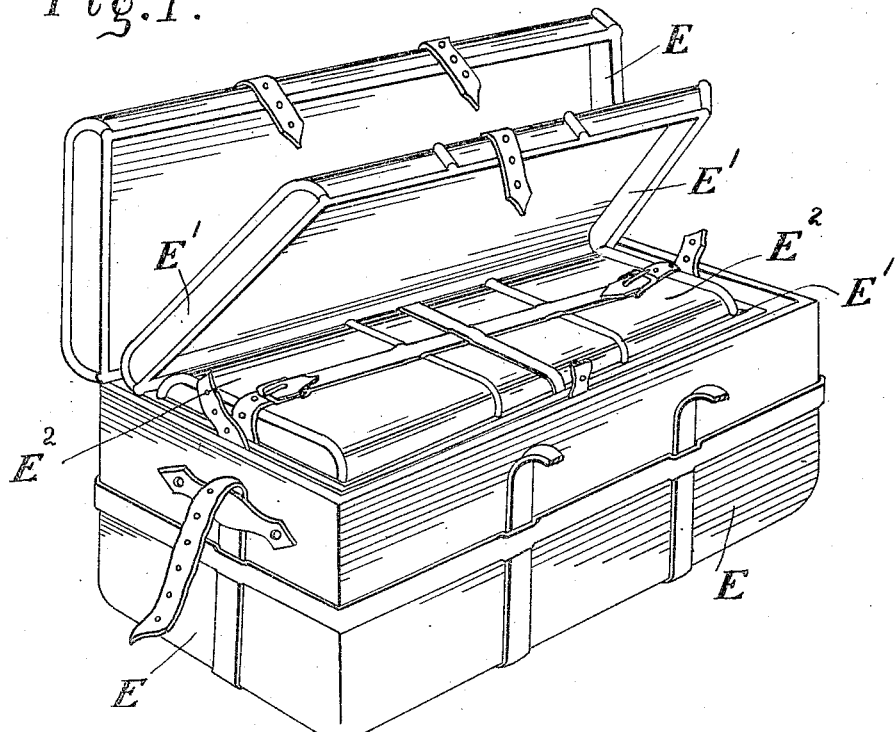
Figure 2:
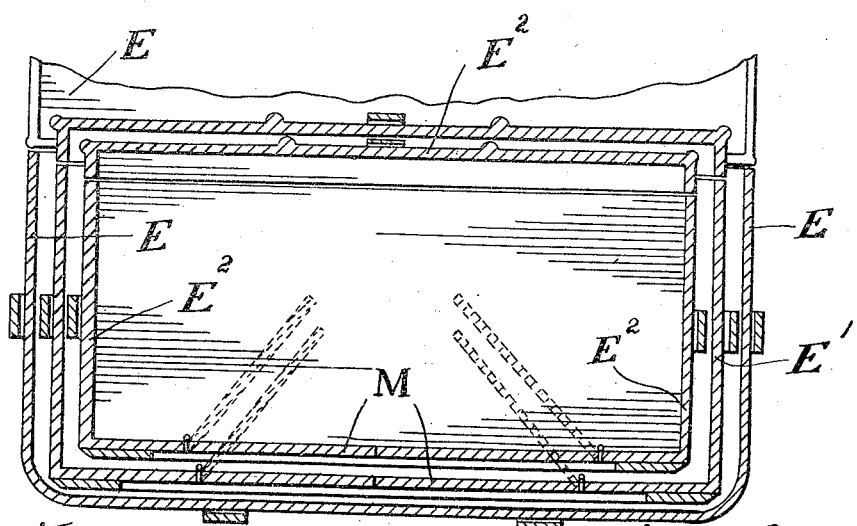
Figure 4:
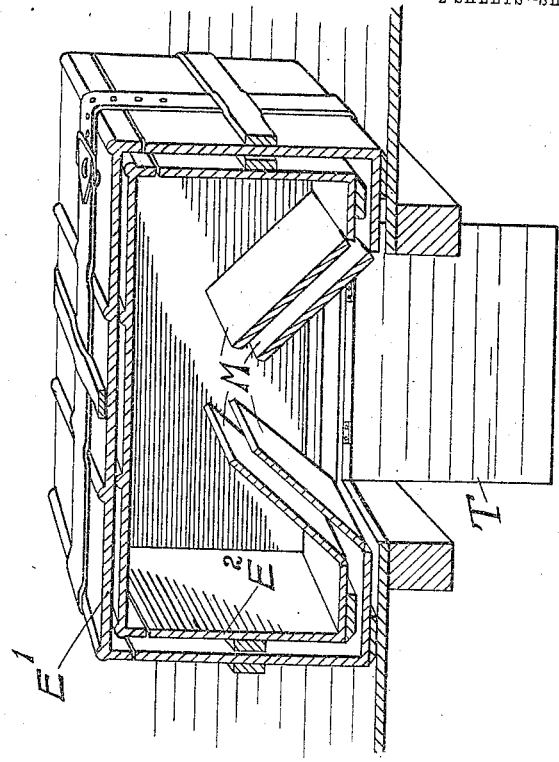
Figure 3:
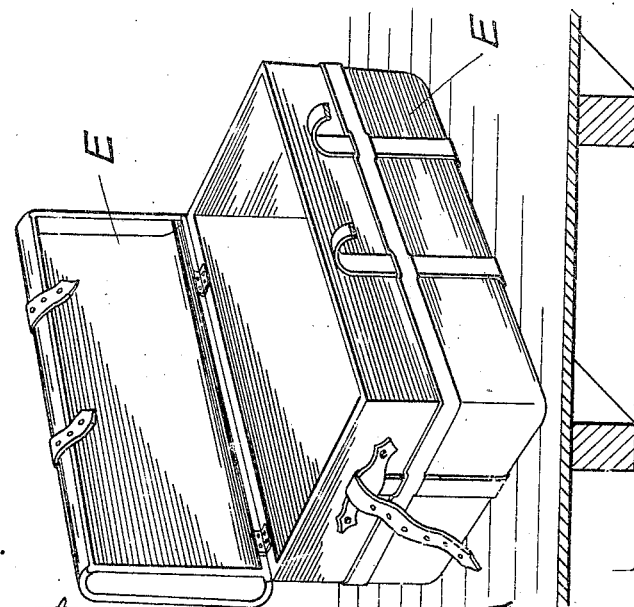

Figure 1 is a view of the series of trunks, the outer and intermediate ones of which are shown partly open. Fig. 2 is a section through the series of trunks, the two inner ones being shown closed and the outer one open. Fig. 3 is a perspective view of the inner trunk in open position; Fig. 4 is a sectional view of the two inner trunks arranged above a trap in the stage.

The outermost trunk E is a substantially constructed trunk of ordinary make, which may be examined or tested in any manner without exposing the illusion.

The trunk E contains two nested trunks $E'$ $E^2$, having bottom doors and in use the trunks all properly nested are brought upon the stage, the outer trunk E being then unbound and opened and the inner trunks raised from within and placed upon the stage and over a trap T in the floor.

The bottom of each of the inner trunks $E'$ $E^2$ is provided with a flap or sliding doors such as M and by which means the lady or other performer can enter the inside of the inner trunk through the trap in the floor or in some cases the inner trunk $E^2$ with the lady contained therein may be bodily inserted into the trunk $E'$ through the floor trap during the time the trunk $E'$ is being unfastened.

Having now described my invention, I declare that what I claim is:—

1. In an illusion apparatus, a series of trunks nesting one within the other, one of said trunks having a concealed means of entrance for an individual.

2. In an illusion apparatus, a series of trunks nesting one within the other, comprising an outer sound trunk and an inner trunk having means for the concealed entrance of an individual.

In witness whereof I have hereunto set my hand in the presence of two witnesses

HORACE GOLDIN.

Witnesses:
 A. NUTTING,
 H. D. JAMESON.